United States Patent
Matsunaga et al.

(10) Patent No.: US 7,564,864 B2
(45) Date of Patent: *Jul. 21, 2009

(54) COMMUNICATION TIMING CONTROL METHOD AND APPARATUS, NODE, AND COMMUNICATION SYSTEM

(75) Inventors: Toshihiko Matsunaga, Osaka (JP); Masaaki Date, Osaka (JP); Yukihiro Morita, Saitama (JP); Shigeru Fukunaga, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 611 days.

This patent is subject to a terminal disclaimer.

(21) Appl. No.: 11/136,447

(22) Filed: May 25, 2005

(65) Prior Publication Data

US 2005/0286647 A1  Dec. 29, 2005

(30) Foreign Application Priority Data

May 27, 2004  (JP)  ............................. 2004-157942

(51) Int. Cl.
*H04L 12/413* (2006.01)
*H04L 12/43* (2006.01)
*H04J 3/00* (2006.01)

(52) U.S. Cl. ................ 370/447; 370/461; 370/498

(58) Field of Classification Search ............... 370/315, 370/321, 337, 342, 347–348, 350, 442, 468, 370/345, 445, 458, 498, 503–520, 447, 461–462; 398/58; 389/58; 375/240.28, 293, 354–357, 375/362–370; 713/400, 500–502
See application file for complete search history.

(56) References Cited

U.S. PATENT DOCUMENTS

| | | | |
|---|---|---|---|
| 7,088,702 B2 * | 8/2006 | Shvodian | 370/348 |
| 7,342,909 B2 * | 3/2008 | Matsuno et al. | 370/342 |
| 2005/0068934 A1 * | 3/2005 | Sakoda | 370/350 |
| 2005/0190796 A1 * | 9/2005 | Date et al. | 370/503 |
| 2005/0249498 A1 * | 11/2005 | Haran et al. | 398/58 |
| 2006/0050727 A1 * | 3/2006 | Matsunaga et al. | 370/445 |

OTHER PUBLICATIONS

Waiyaresu LAN Akitekucha (Wireless LAN Architecture) edited by Matsushita et al., 1996, pp. 47-71.

* cited by examiner

*Primary Examiner*—Tri H Phan
(74) *Attorney, Agent, or Firm*—Venable LLP; Michael A. Sartori; Yao Wang

(57) ABSTRACT

Each node in a communication system transmits and receives state variable signals indicating internal node states or timings. A single node may transmit two or more differently phased series of state variable signals. Neighboring nodes interact by adjusting the timing phase at which they transmit each series of state variable signals according to the timing of state variable signals transmitted in other series, and state variable signals received from other nodes. The nodes can thereby establish time slots in which they can transmit data without collisions, and different nodes can receive different total amounts of time slot width by transmitting different numbers of series of state variable signals.

13 Claims, 6 Drawing Sheets

COMMUNICATION TIMING CONTROL METHOD AND APPARATUS, NODE, AND COMMUNICATION SYSTEM

BACKGROUND OF THE INVENTION

1. Field of the Invention

The present invention relates to a communication timing control method, a communication timing control apparatus, a node, and a communication system, more particularly to a method of avoiding data transmission collisions and accommodating differing amounts of data transmission.

2. Description of the Related Art

Known methods by which a plurality of spatially distributed nodes can transmit data without collisions include time division multiple access (TDMA) and carrier sense multiple access (CSMA), the latter including carrier sense multiple access with collision avoidance (CSMA/CA) and carrier sense multiple access with collision detection (CSMA/CD). A discussion of these methods can be found in, for example, *Waiyaresu LAN Akitekucha* (Wireless LAN Architecture), edited by Matsushita and Nakagawa, Kyoritsu Shuppan, 1996, pp. 47, 53-59, and 69 (in Japanese).

In the CSMA methods, a node with data to transmit determines whether other nodes are transmitting by sensing their carrier signals, and waits until no other node is transmitting before transmitting itself. The CSMA methods have the disadvantage of severely restricting the number of channels that can be used simultaneously.

In the TDMA method, different time slots are assigned to different nodes, and each node transmits data in its own assigned time slot. TDMA can provide more simultaneous communication channels than CSMA, but when the set of communicating nodes changes dynamically, an administrative node must reassign the time slots dynamically. A weakness of the TDMA system is that if the administrative node malfunctions, the entire communication system may be brought down. The process by which time slots are assigned dynamically to nodes is also complex, making it difficult to respond promptly to changing conditions. A further problem is that the width of the time slots cannot be changed to accommodate changing amounts of data transmission.

It would be desirable to have a more flexible method and apparatus for controlling communication timing, so that each node could communicate effectively without having to receive timing control instructions from an administrative node.

SUMMARY OF THE INVENTION

An object of the present invention is to provide a communication timing control method that avoids signal collisions in a communication system by autonomous control of the communicating nodes.

Another object of the invention is to enable the nodes to adjust flexibly to changing conditions in the communication system, including changing amounts of data transmission.

In the invented communication timing control method, each node in the communication system transmits at least one series of output state variable signals indicating an internal operating state or operating timing of the node. The state variable signals in each series are transmitted according to state or timing transitions that take place at a basic transition rate, but the transmission timings are adjusted according to the transmission timings of other series of output state variable signals, and to the reception timings of input state variable signals received from other nodes.

By transmitting and receiving state variable signals and adjusting the transmission timings thereof, a plurality of nodes can interact so as to establish a set of transmission timings that define time slots in which data can be transmitted without collisions.

The number of series of output state variable signals transmitted by a node can be determined according to the amount of data transmitted by the node, so that each node receives a total time slot allocation appropriate to its data transmission needs.

As nodes are added to or removed from the system, moved to new locations, or powered on and off, and as the amount of data a node has to transmit changes over time, the nodes adjust autonomously and flexibly to the changing conditions by interacting with each other, without requiring instructions from an administrative node.

In particular, by changing the number of series of output state variable signals that it transmits, a node can adjust to changing data transmission loads.

DETAILED DESCRIPTION OF THE INVENTION

Figure 1:
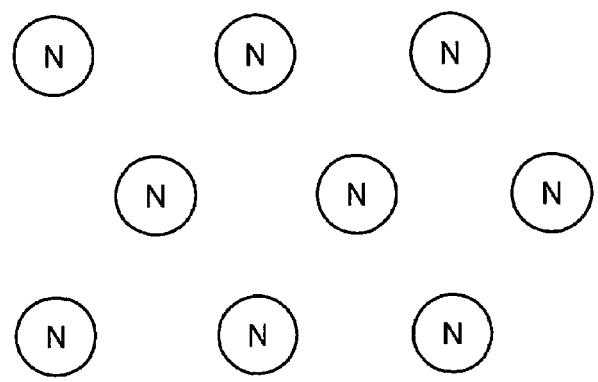
FIG. 1 shows an arrangement of nodes.

Embodiments of the invention will now be described with reference to the attached drawings, in which like elements are indicated by like reference characters.

Referring to FIG. 1, the communication system in the following embodiments is a network comprising a plurality of nodes N.

FIRST EMBODIMENT

Figure 2:
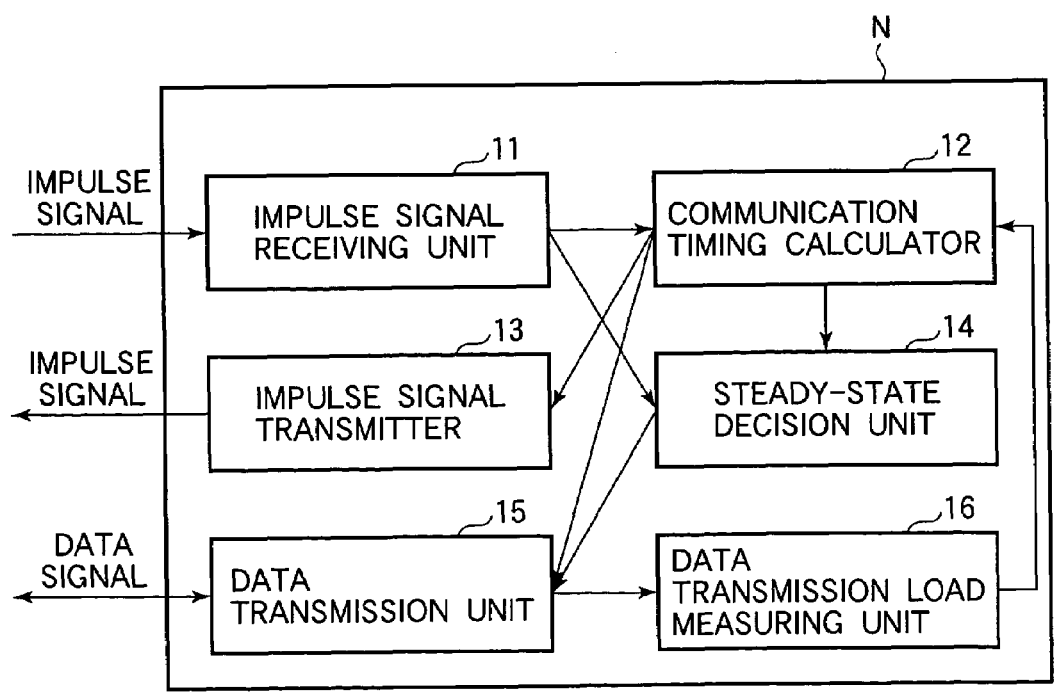
FIG. 2 is a functional block diagram showing the internal structure of a node in the first embodiment.

Referring to FIG. 2, each node N in the first embodiment comprises an impulse signal receiving unit 11, a communication timing calculator 12, an impulse signal transmitter 13, a steady-state decision unit 14, a data transmission unit 15, and a data transmission load measuring unit 16. The impulse signal receiving unit 11, communication timing calculator 12, impulse signal transmitter 13, steady-state decision unit 14, and data transmission load measuring unit 16 combine to function as a communication timing control apparatus.

The impulse signal receiving unit 11 receives impulse signals transmitted by neighboring nodes. Two nodes are considered to be neighboring if they are within receiving range of each other's impulse signals. An impulse signal is a timing signal, not including a destination address. The impulse signal may have, for example, a Gaussian waveshape. The impulse signal receiving unit 11 sends each received impulse signal, or a reshaped version of the impulse signal, or a signal generated from the received impulse signal, to the communication timing calculator 12 and steady-state decision unit 14.

The communication timing calculator 12 at a given node generates one or more phase signals $\theta_i(t)$ with a value that is advanced by the amount given in equation (1) below at successive times t. This equation models a type of nonlinear oscillation. The invention is not limited to the use of this particular model; other equations that model nonlinear oscillation may be used instead. The phase value may be regarded as a state variable of the node, and an impulse signal transmitted in synchronization with the phase signal $\theta_i(t)$ may be regarded as a state variable signal.

$$d\theta_i(t)/dt = \omega + \sum_{k=1}^{N} P_k(t) \cdot R(\theta_i(t), \sigma(t)) \quad (1)$$

$$R(\theta_i(t), \sigma(t)) = \sin(\theta_i(t) + \sigma(t)) \quad (2)$$

$$\sigma(t) = \pi + \phi(t)$$

$\theta_i(t)$: phase signal
$\omega$: natural angular frequency parameter
$P_k(t)$: impulse signal received from another node, or transmitted on the basis of a different phase signal
$R(\theta_i(t), \sigma(t))$: phase response function
$\phi(t)$: random noise function Equation (1) is essentially a rule for generating a timing cycle with a natural angular frequency expressed by the parameter $\omega$, and adjusting the phase of the timing cycle according to transmitted and received impulse signals, which are expressed by the function $P_k(t)$. For an impulse signal received from another node, $P_k(t)$ expresses the value at time t of the output of the impulse signal receiving unit 11. For an impulse signal transmitted in synchronization with another timing cycle generated by the same communication timing calculator 12, $P_k(t)$ is obtained from the communication timing calculator 12 itself. N is the total number of series of impulse signals transmitted and received, other than the series of impulse signals transmitted in synchronization with the phase signal $\theta_i(t)$ itself, which are excluded from the calculation.

The function $R(\theta_i(t), \sigma(t))$ is a phase response function that adjusts the phase of the timing cycle in response to the N impulse signals $P_k(t)$. The phase response function $R(\theta_i(t), \sigma(t))$ and may be defined as in, for example, equation (2), which adds random noise in complementary phase to the phase value $\theta_i(t)$ Equations (1) and (2) have a nonlinear operating characteristic that acts as a repulsion rule by attempting to separate the phases of interacting timing cycles. The constant term $\pi$ in equation (2) attempts to establish a complementary phase relationship between different timing cycles. The random noise function $\phi(t)$ gives the nonlinear characteristic a random variability by generating noise (random values) according to, for example, a Gaussian probability distribution with a mean value of zero. The random variability is added to keep the system from becoming trapped in a locally stable state (local solution) other than the desired stable state (optimal solution).

The phase response function $R(\theta_i(t), \sigma(t))$ in equation (2) above is a sine function, but the invention is not limited to the use of a sine function, and the constant term is not limited to $\pi$. The constant term may be any constant $\lambda$ other than zero or an even multiple of $\pi$ (e.g., any value in the range $0<\lambda<2\pi$). If a constant other than $\pi$ is used, the result will be that two interacting timing cycles tend to assume different but not reverse phases.

Figure 3A:
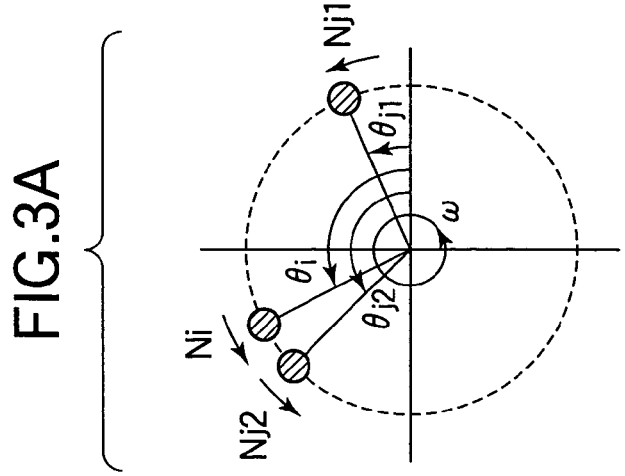
FIG. 3A illustrates an initial state during communication among three nodes in the first embodiment.
Figure 3B:
FIG. 3B illustrates a transitional state during communication among the three nodes.
Figure 3B:
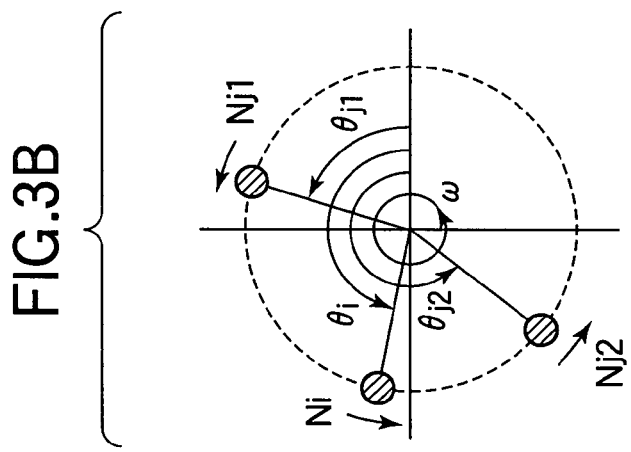
Figure 3C:
FIG. 3C illustrates the steady state during communication among the three nodes.
Figure 3C:
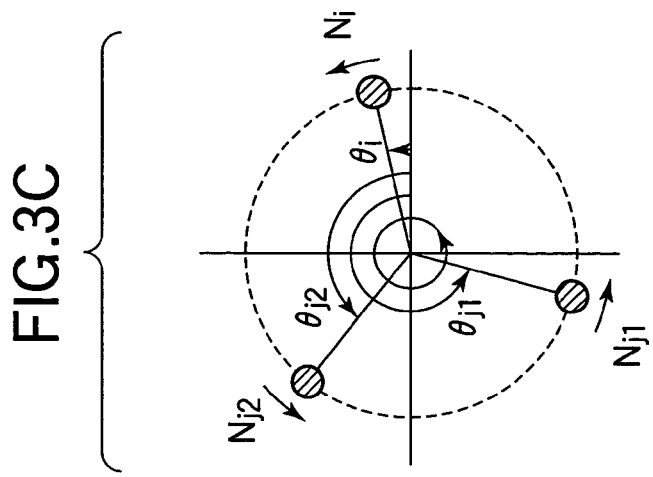

The interaction described above is illustrated in FIGS. 3A, 3B, and 3C for the case of three interacting nodes (nodes Ni, Nj1, and Nj2) generating one timing cycle each. FIG. 3A shows an exemplary initial state from which the interaction begins. Nonlinear oscillation is modeled by the motion of three point masses rotating around a circle, expressing the values of phase signals $\theta_i$, $\theta_{j1}$, $\theta_{j2}$. All three point masses rotate at the same basic angular velocity $\omega$. Projected onto the vertical axis or horizontal axis, the motion of each point mass exhibits harmonic nonlinear oscillation. The nodes interact by transmitting and receiving impulse signals in synchronization with their phase signals $\theta_i$, $\theta_{j1}$, $\theta_{j2}$ and periodically adjusting the angular velocity of their phase signals according to equation (1). With the elapse of time the initial state in FIG. 3A evolves through a transitional state such as the one in FIG. 3B into a steady state with a phase difference of $2\pi/3$ as shown in FIG. 3C, in which a maximally separated phase relationship is maintained. This process can be understood as operating by mutual repulsion of the three point masses as they rotate.

Similar operations occur when the number of interacting nodes is two, or four or more.

The natural angular frequency parameter $\omega$ preferably has a uniform predetermined value throughout the communication system, as this facilitates rapid convergence to the steady state.

Figure 4:
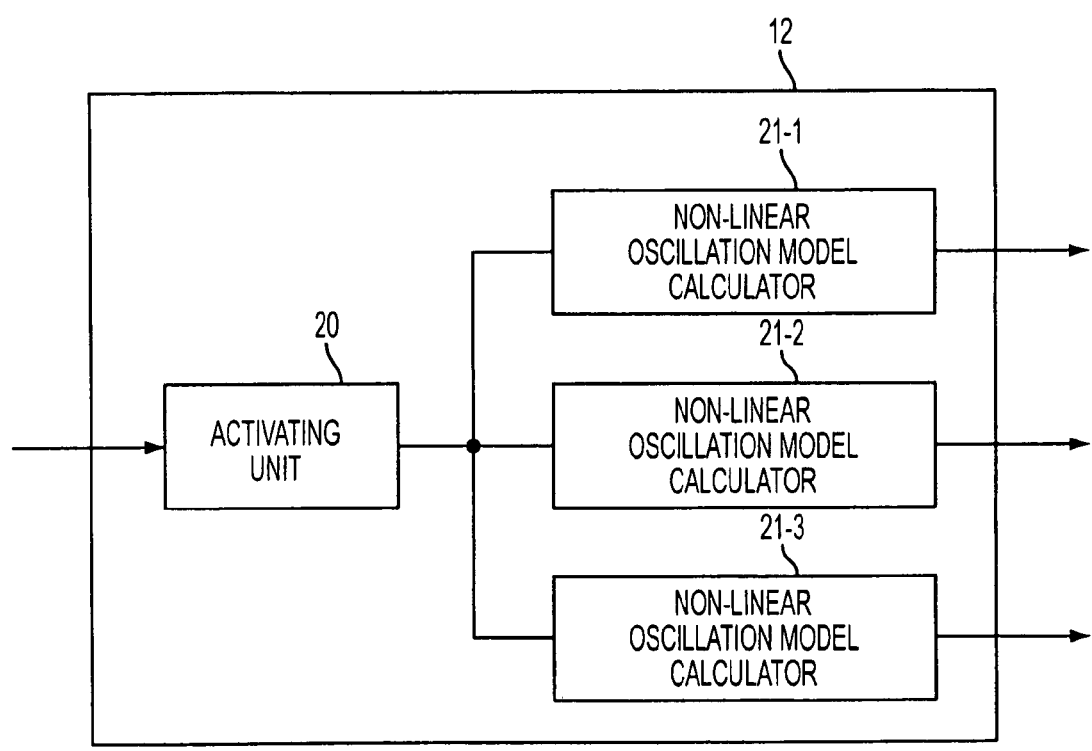
FIG. 4 illustrates the internal structure of the communication timing calculator in FIG. 1.

As shown in FIG. 4, the communication timing calculator 12 has an activating unit 20 and a plurality of non-linear oscillation model calculators. FIG. 4 shows an example with three non-linear oscillation model calculators 21-1, 21-2, 21-3.

Each of the non-linear oscillation model calculators 21-1, 21-2, and 21-3 carries out the calculation in equation (1) above. The activating unit 20 assigns impulse signals to a selectable number P of non-linear oscillation model calculators on the basis of input from the data transmission load measuring unit 16. In the following description, a non-linear oscillation model calculator to which an impulse signal is assigned will be said to be active.

A plurality of non-linear oscillation model calculators may be provided in advance in hardware or software and the activating unit 20 may activate the necessary number (P) of them. If the non-linear oscillation model calculators are software facilities or 'tasks', the activating unit 20 may generate new non-linear oscillation model calculators as the need arises, and delete them when they are no longer needed. An inactive non-linear oscillation model calculator may be halted to conserve power. Alternatively, an inactive non-linear oscillation model calculator may continue to perform the calculation in equation (1) and generate a phase signal, but no impulse signals are transmitted in synchronization with the phase signal.

The communication timing calculator 12 outputs the phase signal $\theta_i(t)$ generated by each active non-linear oscillation model calculator to the impulse signal transmitter 13, steady-state decision unit 14, and data communication unit 15.

The impulse signal transmitter 13 transmits output impulse signals according to each received phase signal $\theta_i(t)$, by transmitting an output impulse signal when the phase signal $\theta_i(t)$ takes on a specific value $\alpha (0 \leq \alpha < 2\pi)$. It is convenient for a particular value of $\alpha$ to be uniformly set for the entire system. No generality is lost by assuming that $\alpha = 0$, so in the following description it will be assumed that $\alpha = 0$ uniformly throughout the system. In FIG. 3C, for example, since there is a phase difference of $2\pi/3$ between the three phase signals $\theta_i$, $\theta_{j1}$, $\theta_{j2}$ in the steady state, even if all three nodes transmit impulse signals at phase $\alpha = 0$, the transmission timings of their impulse signals are separated by a phase difference of $2\pi/3$.

The steady-state decision unit 14 decides whether the transmission timings of the output impulse signals at its own node and one or more neighboring nodes are in a transitional state (as in FIG. 3B) or the steady state (as in FIG. 3C). The steady-state decision unit 14 observes the timing of the impulse signals received from other nodes and the timing of the output impulse signals transmitted from its own node, and decides that they are in the steady state if the timing differences remain constant, or nearly constant, over time. The steady-state decision unit 14 acquires the timing of the impulse signals transmitted from its own node by receiving the corresponding phase signals from the communication timing calculator 12.

The steady-state decision unit 14 can make the steady-state decision by performing the following steps (a) to (d) in synchronization with a particular phase signal $\theta_i(t)$ received from the communication timing calculator 12, such as the phase signal output by the first non-linear oscillation model calculator 21-1.

(a) The value $\beta$ of the phase signal $\theta_i(t)$ at the timing of the arrival of each received impulse signal from the impulse signal receiving unit 11, and the timing of each output impulse signal transmitted by the impulse signal transmitter 13, other than impulse signals generated from phase signal $\theta_i(t)$, is observed for one period of phase signal $\theta_i(t)$. Let the N observed values $\beta$ of the phase signals $\theta_i(t)$ be:

$$\beta_1, \beta_2, \ldots, \beta_N \ (0 < \beta_1 < \beta_2 < \ldots < \beta_N < 2\pi)$$

(b) The differences (phase differences) $\Delta$ between adjacent values are calculated from the observed values $\beta$ of the phase signals $\theta_i(t)$.

$$\Delta_1 = \beta_1, \Delta_2 = \beta_2 - \beta_1, \ldots, \Delta_N = \beta_N - \beta_{N-1}$$

(c) Processes (a) and (b) above are carried out at intervals of one period of the phase signal $\theta_i(t)$ and the rate of change $\gamma$ (differences) in the phase difference $\Delta$ between adjacent periods is calculated.

$$\gamma_1 = \Delta_1(\tau+1) - \Delta_1(\tau), \gamma_2 = \Delta_2(\tau+1) - \Delta_2(\tau), \ldots, \gamma_N = \Delta_N(\tau+1) - \Delta_N(\tau)$$

where $\tau$ indicates discrete time in units of one period of the phase signal $\theta_i(t)$ (d) The steady state is recognized when the above rates of change $\gamma$ are all smaller than a predetermined value $\epsilon$.

$$\gamma_1 < \epsilon, \gamma_2 < \epsilon, \ldots, \gamma_N < \epsilon$$

It is also possible, however, to make the steady state decision according to whether the decision condition $$\gamma_1 < \epsilon, \gamma_2 < \epsilon, \ldots, \gamma_N < \epsilon$$

is satisfied over M periods (where M is an integer greater than two). The larger the value of M is, the more stable the state must be in order for the steady-state decision unit 14 to decide that the steady state has been reached. Alternatively, the decision may be based on only some of the received impulse signals.

At intervals equal to one period of the phase signal $\theta_i(t)$, the steady-state decision unit 14 sends the data communication unit 15 a steady-state decision signal indicating the decision result, and a slot signal equal to the first observed phase value $\beta_1$ in the current cycle of the phase signal $\theta_i(t)$.

The data communication unit 15 receives data transmitted by other nodes and transmits data originating at or relayed by its own node. When the steady-state decision signal indicates that the steady state has been recognized, the data communication unit 15 transmits data in a time slot as described below. (The term 'time slot' will be used even though it does not indicate a fixed time interval allocated by the system.) When the steady-state decision signal indicates a transitional state, the data communication unit 15 does not transmit data.

A time slot is a time interval during which $\theta_i(t)$ satisfies the following condition:

$$\delta_1 < \theta_i(t) < \beta_1 - \delta_2$$

The time slot starts at a phase timing $\delta_1$ following the transmission of the output impulse signal at phase $\alpha = 0$, and ends at a phase timing time $\beta_1 - \delta_2$ preceding the next transmitted or received impulse signal, offset by an amount $\delta_2$ from the timing $\beta_1$ of that impulse signal. The parameters $\delta_1$ and $\delta_2$ are phase widths representing very short spaces of time that assure that impulse signals transmitted from the transmitting node or another neighboring node and data signals transmitted from the transmitting node or another neighboring node are not both present in the space near the transmitting node at the same time.

In the steady state shown in FIG. 3C, for example, node Ni starts the transmission of an impulse signal at phase zero $\theta_i(t) = 0$, ends transmission of the impulse signal before phase $\delta_1$, starts transmission of a data signal at phase $\delta_1$ ($\theta_i(t) = \delta_1$), ends transmission of the data signal at phase $\beta_1 - \delta_2$ ($\beta_1 = 2\pi/3$), and does not transmit further impulse signals or data signals until the phase returns to zero. Nodes Nj1 and Nj2 carry out the same operations but in synchronization with different phase signals $\theta_{j1}(t)$ and $\theta_{j2}(t)$; the phase difference of $2\pi/3$ or $4\pi/3$ between $\theta_i$ and $\theta_{j1}$ or $\theta_{j2}$ prevents the transmitted data and impulse signals from colliding.

The data transmission load measuring unit 16 measures the amount of data transmitted by its own node and decides when to increase or decrease the number P of time slots allocated to its own node. The measured amount of data may be the amount of data that the node has just transmitted (the following description will be based on this assumption) or an amount of data queued in the node and awaiting transmission. More generally, the data transmission load measuring unit 16 can measure any quantity that indicates the expected rate of data transmission from its own node. On the basis of this measurement, the data transmission load measuring unit 16 sends the communication timing calculator 12 a signal directly specifying the desired number P of active non-linear oscillation model calculators or, as assumed in the following description, instructing the activating unit 20 to increase or decrease the number P of active non-linear oscillation model calculators.

Next, the operation of the communication system in the first embodiment will be described through another example of interaction among three nodes.

Figure 5A:
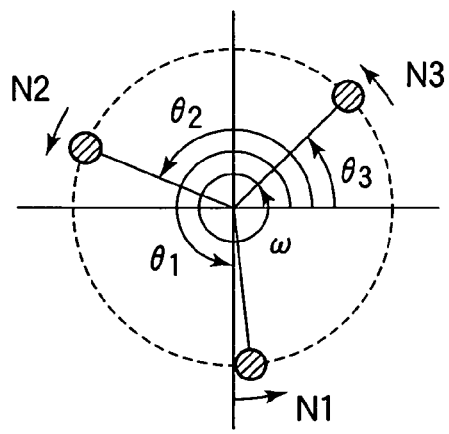
FIG. 5A illustrates a steady state in which each of three nodes transmits one series of state variable signals.

Referring to FIG. 5A, this example starts from a steady state in which each of the three nodes N1, N2, and N3 has only one active non-linear oscillation model calculator 21-1. The phase signals $\theta_1$, $\theta_2$, and $\theta_3$ of nodes N1, N2, and N3 are separated by intervals of $2\pi/3$, creating three time slots of equal width in which the three nodes N1, N2, N3 may transmit data signals.

When nodes N1, N2, and N3 transmit data signals in their allocated time slots, the data signals are also input to the data transmission load measuring units 16, which measure the amount of data transmitted. If, for example, the data transmission load measuring unit 16 at node N1 finds that the amount of the data transmitted exceeds a predetermined threshold value, it sends an impulse signal assignment request to the communication timing calculator 12, requesting the activation of an additional non-linear oscillation model calculator.

Figure 5B:
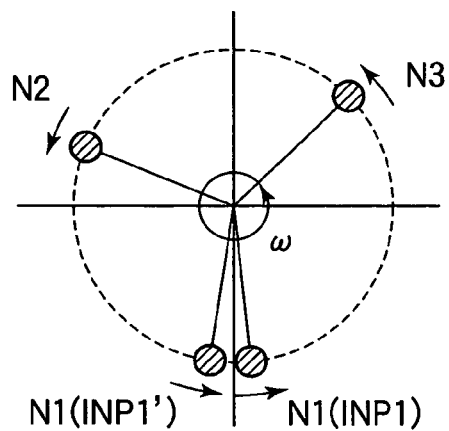
FIG. 5B illustrates a transitional state in which one of the three nodes starts to transmit two series of state variable signals.

In the communication timing calculator 12, upon receiving the impulse signal assignment request, the activating unit 20 generates or activates a new non-linear oscillation model calculator 21-2, and the impulse signal transmitter 13 in node N1 starts transmitting a new series of impulse signals INP1' as well as the original series of impulse signals INP1. The initial impulse signals in these two series are transmitted at nearly the same timing, as shown in FIG. 5B.

Both non-linear oscillation model calculators 21-1 and 21-2 receive information about the transmission timing of each other's impulse signals, as well as the timing of the impulse signals received from nodes N2 and N3, and treat each other's impulse signals INP1 and INP1' as if they had been received from a different node. In effect, node N1 is now operating as two nodes (the original node N1 and a new virtual node N1'). Since the impulse signal timings are not in the steady-state condition, node N1 suspends transmission of data.

Nodes N2 and N3 are also no longer in a steady state once they begin receiving the additional impulse signals from node N1, so they suspend transmission of data signals while they interact with the original node N1 and the new virtual node N1'. This interaction leads to a new steady state.

Figure 5C:
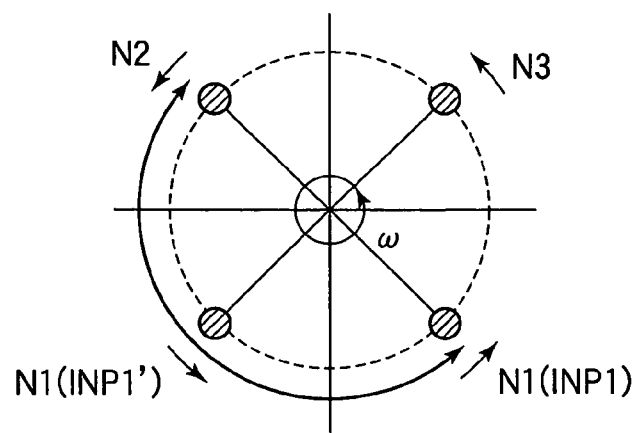
FIG. 5C illustrates a new steady state reached from the transitional state in FIG. 5B.

When the new steady state is reached, all three nodes resume the suspended transmission of data signals. FIG. 5C shows the phase relationship in the new steady state. Four time slots are formed by quadrisection of the phase cycle, two consecutive time slots being allocated to node N1. The time slot allocation to node N1 has increased from substantially one third ($2\pi/3$) to substantially one half ($\pi$) of the total phase cycle ($2\pi$).

The two time slots allocated to node N1 are consecutive because the corresponding impulse signals INP1 and INP1' are consecutive in the cyclic sequence of impulse signals transmitted by the three nodes. This occurs because impulse signals INP1 and INP1' were originally transmitted at nearly the same time.

If the impulse signals and data signals are transmitted in separate frequency bands so that they do not interfere, node N1 may treat its two time slots as one continuous time slot of double width, during which it can transmit data in a continuous stream. Besides providing additional data transmission time by eliminating the interruption (of length $\delta_1+\delta_2$) at the second transmitted impulse signal, this arrangement reduces the amount of overhead transmission. For example, a transmission header and synchronization pattern need be transmitted only once, at the beginning of the double-width time slot.

If the amount of data transmitted by node N1 later decreases, the data transmission load measuring unit 16 at node N1 may send the communication timing calculator 12 at node N1 a signal requesting de-assignment of an impulse signal, and the activating unit 20 in the communication timing calculator 12 may respond by deactivating or deleting non-linear oscillation model calculator 21-2. Nodes N1, N2, and N3 then return to the steady state shown in FIG. 5A.

If node N1 stops transmitting data entirely, the data transmission load measuring unit 16 may have the activating unit 20 in the communication timing calculator 12 deactivate all of the non-linear oscillation model calculators, in which case node N1 stops transmitting impulse signals and does not interact with nodes N2 and N3. Nodes N2 and N3 then widen their time slots and reach a new steady state with a phase difference of substantially $\pi$ radians between their phase signals.

Similar adaptations are made when nodes are added to or removed from the communication system, powered on or off, or moved to new locations. By enabling each node to establish its own time slots through interaction with its neighboring nodes, the first embodiment enables the nodes to adapt autonomously and flexibly to changing conditions. In particular, a node can increase or decrease its total time slot width allocation according to the amount of data it has to transmit. This feature enables a node to escape from the state in which it always has a large amount of data queued awaiting transmission, and to avoid problems such as buffer overflow.

SECOND EMBODIMENT

Figure 6:
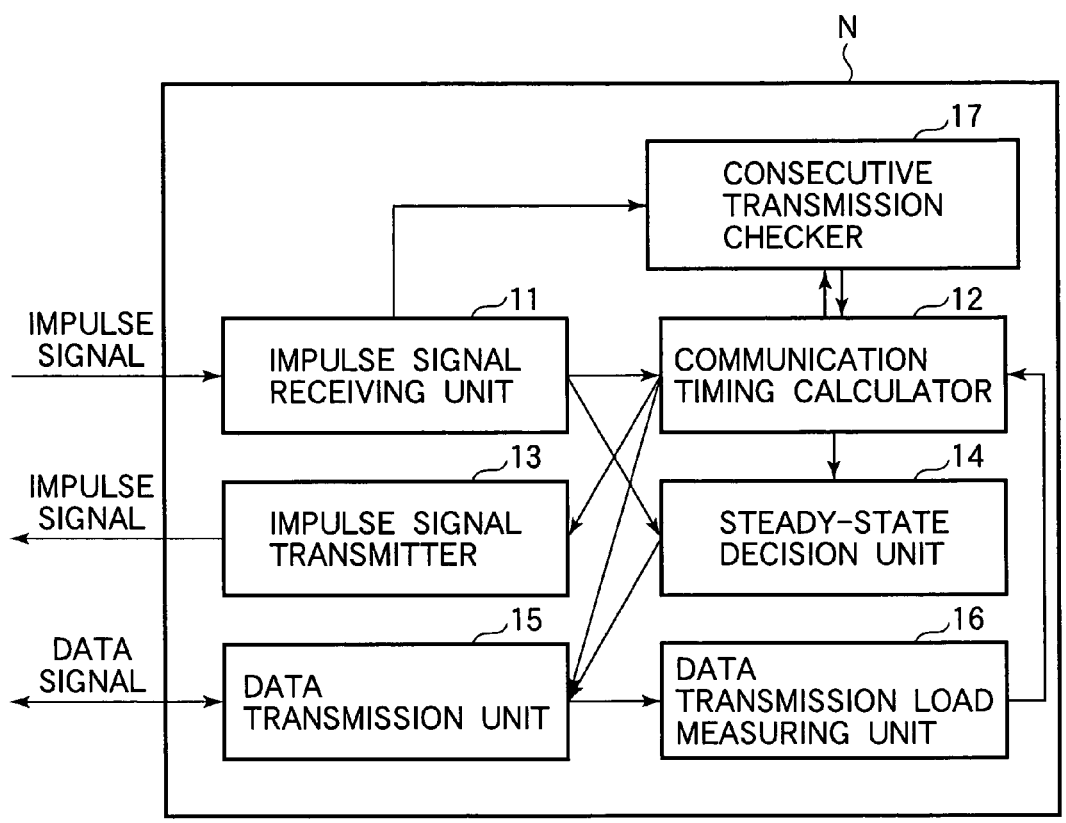
FIG. 6 is a functional block diagram showing the internal structure of a node in a second embodiment of the invention.

Referring to FIG. 6, each node in the second embodiment has a consecutive transmission checker 17 in addition to the components in the first embodiment. The consecutive transmission checker 17 functions when its own node has two or more active non-linear oscillation model calculators and thus transmits two or more series of impulse signals synchronized to different phase signals, as described in the first embodiment. The consecutive transmission checker 17 checks that the differently phased impulse signals transmitted by the node follow one another consecutively, and sends the communication timing calculator 12 a restart request signal if they do not.

The consecutive transmission checker 17 may operate by using, for example, a built-in counter (not shown). When the node transmits its first impulse signal, the consecutive transmission checker 17 sets the built-in counter to a value one less than the number of differently phased series of impulse signals transmitted from its own node (the number of active non-linear oscillation model calculators). The consecutive transmission checker 17 then decrements the count value every time it receives an impulse signal transmission notification from the communication timing calculator 12, until it receives a signal from the impulse signal receiving unit 11 indicating that an impulse signal has been received from another node, terminating the consecutive series of impulse signals transmitted by its own node. If this occurs before the count value reaches zero, the consecutive transmission checker 17 informs the timing decision unit 12 that the transmitted impulse signals are no longer consecutive by sending the timing decision unit 12 a restart request signal.

Figure 7A:
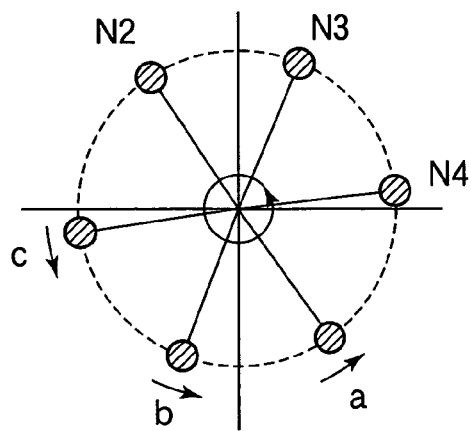
FIG. 7A illustrates a steady state in which one of four interacting nodes transmits three consecutive state variable signals.

FIG. 7A shows a steady-state phase relationship among node N1 and three nodes N2, N3, N4 positioned within interacting range, when node N1 transmits three consecutive differently phased impulse signals a, b, and c.

When the initial impulse signal a is transmitted from node N1, the counter in the consecutive transmission checker 17 is set to a count value of two (2). This count is decremented when the second and third impulse signals b and c are transmitted, thereby reaching zero.

Figure 7B:
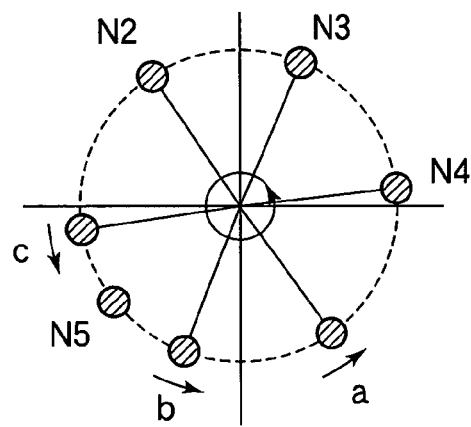
FIG. 7B illustrates a transitional state in which a fifth node enters the interaction.
Figure 7C:
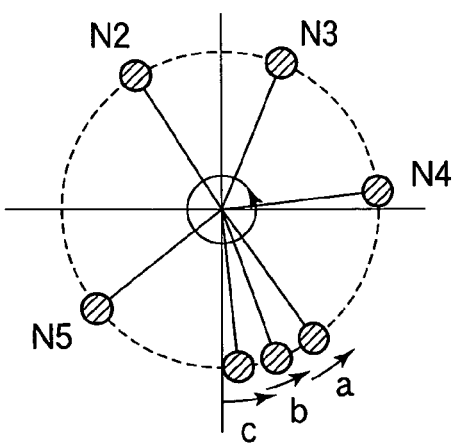
FIG. 7C illustrates a further transitional state following a timing reset in the interaction in FIG. 7B.

FIG. 7B shows a later state in which a new node N5 enters the interaction and transmits an impulse signal before node N1 transmits the last impulse signal c in its cycle of impulse signals. Since node N1 receives the impulse signal from node N5 before the count value reaches zero, the consecutive transmission checker 17 sends a restart request signal to the communication timing calculator 12. The communication timing calculator 12 responds by resetting its three phase signals so that the three impulse signals a, b, c are transmitted in rapid succession at nearly the same time, and resumes interaction with the other nodes from a state such as shown in FIG. 7C.

The second embodiment produces the same effects as in the first embodiment, and the following additional effects. In the second embodiment, a node which is transmitting a plurality of differently phased impulse signals restarts time slot allocation control if it receives an impulse signal from another node during the interval from transmission of the first impulse signal to transmission of the last impulse signal, thereby maintaining consecutive transmission of the differently phased impulse signals. This enables the node to continue to transmit data without additional overhead in the second and subsequent consecutive time slots.

VARIATIONS

The embodiments above describe a case in which a plurality of time slots are allocated dynamically as the data transmission load on a node varies, but the time slots may be allocated permanently when the nodes are installed in the network.

Although it is desirable for the plurality of time slots allocated to a node to be consecutive, this is not always a necessary condition. The time slots of one node may be interspersed among the time slots of other nodes.

The present invention is applicable not only to wireless communication systems but also to wired communication systems.

Several variations using other types of state-variable signals are possible, as shown in the specification and drawings of Japanese Patent Application No. 2003-328530.

Those skilled in the art will recognize that further variations are possible within the scope of the invention, which is defined in the appended claims.

What is claimed is:

1. A communication timing control apparatus provided in each of a plurality of nodes in a communication system in which the nodes transmit data to each other, the communication timing control apparatus comprising:

a selecting unit for selecting a positive number P;

a transmitting and receiving unit for periodically transmitting, to at least one other node in the communication system, for each integer n from one to P, a series of output state variable signals indicating an operating state or operating timing of its own node, and receiving, from the at least one other node in the communication system, at least one series of input state variable signals indicating an operating state or operating timing of the at least one other node; and a timing decision unit for generating, for each said integer n from one to P, a series of transitions in the operating state or operating timing of its own node, the transitions occurring at a basic transition rate, but at timings adjusted according to the at least one series of input state variable signals and to the transitions in the series of transitions generated for integers from one to P other than n, and using said transitions to schedule data transmissions to the at least one other node; wherein the series of output state variable signals transmitted by the transmitting and receiving unit are synchronized with respective series of transitions generated by the timing decision unit.

2. The communication timing control apparatus of claim 1, wherein the selecting unit measures an amount of data transmission by the node and selects the number P according to the measured amount.

3. The communication timing control apparatus of claim 1, wherein the timing decision unit comprises:

a plurality of calculators for calculating differently phased transitions in said operating state or operating timing; and an activating unit for activating the selected number P of said calculators, output state variable signals being transmitted in synchronization with the transitions calculated by the active calculators.

4. The communication timing control apparatus of claim 1, wherein if the selected number P is greater than one, the timing decision unit adjusts the transition timings so that P output state variable signals, one from each series of output state variable signals, are transmitted in a consecutive sequence uninterrupted by reception of input state variable signals from the at least one other node.

5. The communication timing control apparatus of claim 4, wherein the timing decision unit starts by having the P output state variable signals in the consecutive sequence transmitted at substantially identical timings, then adjusts the timings of the transitions so as to gradually separate the timings of transmission of the P output state variable signals.

6. The communication timing control apparatus of claim 4, further comprising a consecutive transmission checker for checking whether an input state variable signal is received between transmission of a first output state variable signal in the consecutive sequence of P output state variable signals and a last output state variable signal in the consecutive sequence of P output state variable signals, and restarting the timing decision unit if an input state variable signal is received between transmission of said first output state variable signal and transmission of said last output state variable signal.

7. A communication node including the communication timing control apparatus of claim 1.

8. A communication system comprising a plurality of communication nodes, each communication node including the communication timing control apparatus of claim 1.

9. A method of controlling communication timing in a communication system having a plurality of nodes, the method comprising:

receiving, at an arbitrary node in the communication system, at least one series of input state variable signals transmitted by at least one other node in the communication system, indicating an operating state or operating timing of said at least one other node;

selecting a positive number P designating a number of series of output state variable signals to be transmitted by the arbitrary node;

generating, for each integer n from one to P, a series of transitions in the internal operating state or operating timing at the arbitrary node, the transitions in each series occurring at a basic transition rate, but at timings adjusted according to the at least one series of input state variable signals and to the transitions in the series of transitions generated for integers from one to P other than n at the arbitrary node; and transmitting, from the arbitrary node, for each said integer n from one to P, a series of output state variable signals synchronized with respective series of transitions generated for said integer n, the output state variable signals indicating an operating state or operating timing of the arbitrary node.

10. The communication timing control method of claim 9, wherein selecting the number P comprises measuring an amount of data transmission at the arbitrary node.

11. The communication timing control method of claim 10, wherein selecting the number P comprises increasing or decreasing the number P according to the measured amount of data transmission.

12. The communication timing control method of claim 11, further comprising setting the series of transitions generated for each said integer n from one to P to substantially identical starting timings when the number P is increased.

13. The communication timing control method of claim 9, further comprising setting the series of transitions generated for each said integer n from one to P to substantially identical starting timings when the P series of transitions fail to produce a consecutive sequence of P output state variable signals uninterrupted by reception of an input state variable signal.

* * * * *